No. 653,002. Patented July 3, 1900.
J. ELLIS.
DEVICE FOR ATTACHING FILTERS TO FAUCETS, &c.
(Application filed Dec. 15, 1898. Renewed Dec. 11, 1899.)
(No Model.)

Witnesses

Inventor
John Ellis,
Per Edwin W. Brown,
Attorney.

UNITED STATES PATENT OFFICE.

JOHN ELLIS, OF LYNN, MASSACHUSETTS.

DEVICE FOR ATTACHING FILTERS TO FAUCETS, &c.

SPECIFICATION forming part of Letters Patent No. 653,002, dated July 3, 1900.

Application filed December 15, 1898. Renewed December 11, 1899. Serial No. 740,017. (No model.)

*To all whom it may concern:*

Be it known that I, JOHN ELLIS, of Lynn, in the county of Essex and State of Massachusetts, have invented certain new and useful Improvements in Devices for Attaching Filters to Faucets, &c., of which the following is a full, clear, and exact description.

This invention consists of a device adapted to be secured to a water or other faucet and constructed and arranged to receive and hold a water or other filter, all substantially as fully described, reference being had to the accompanying sheet of drawings, in which is illustrated the present invention.

Figure 1:
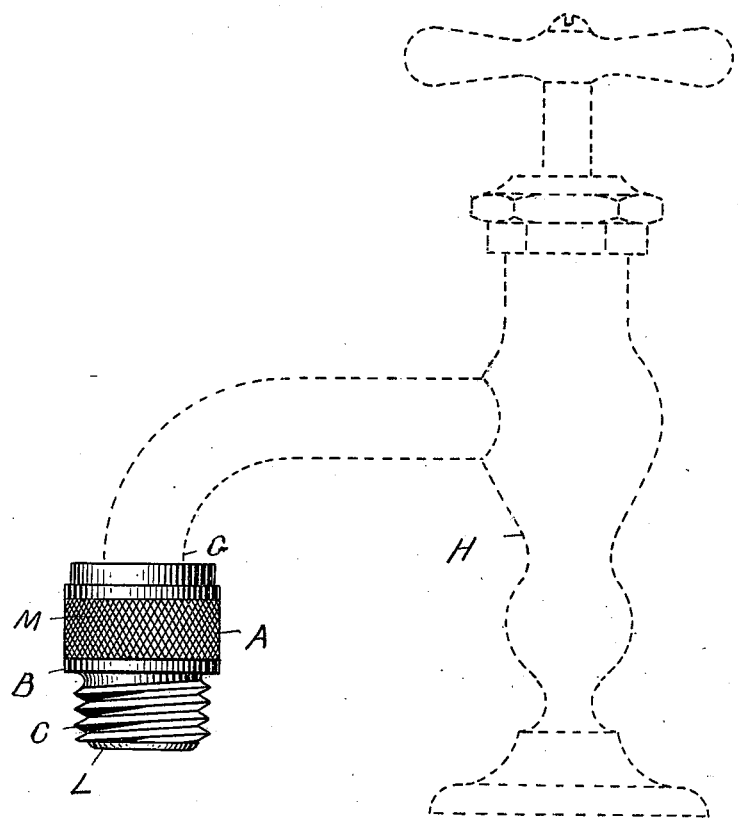
Figure 2:
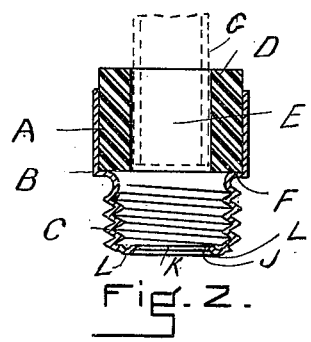

Figure 1 is a side view of such attaching device as applied to a water-faucet, which is shown in dotted lines. Fig. 2 is a vertical cross-section of the attaching device.

In the drawings, A represents the attaching device, consisting of a short tube B, preferably of metal, having an external screw-thread C on one end adapted to receive a filter for water or other liquid. Within one end of the tube is inserted a piece of india-rubber D, tightly fitting therein and resting or bearing on an internal shoulder F of the tube, the piece of india-rubber having a central hole E through it. The hole through the india-rubber piece is for attaching the device to a faucet, the diameter of the hole corresponding to the diameter of the end C of the faucet H, to which it is to be attached. It is preferable to have the hole of a little less diameter than the outside diameter of the end C of the faucet over which it is to be placed for it to fit closely and snugly thereon to hold the attachment firmly to the faucet to prevent detachment therefrom from any ordinary or usual use of the same. The tube is closed a short distance over the screw end, making a flange J, having a central hole K through it of smaller diameter than the tube, which serves as a guide to the stream of water passing through it to the filter, causing the stream to be smooth and round. On the outer side of this flange J is a circular rib or bead L, extending around the same, against which the flexible washer usually in a filter bears, the rib indenting itself in the washer as the filter is screwed firmly to the attachment, making a close joint between the attachment and the filter and preventing leakage of water at the joint.

The outside of the device has a roughened surface M to enable a better hold of it when attaching it to the faucet.

This device makes a very simple and convenient means of attaching a filter to a water-faucet having a smooth end, as after the device is secured to the faucet the filter can be easily screwed thereon or unscrewed therefrom, as desired, which is particularly desirable in reversing the filter.

Any suitable elastic material can be used for the central piece; but india-rubber is preferable.

Having thus described my invention, what I claim is—

1. A device for the purpose described, consisting of a tube with internal shoulder, and screw-threads at one end for the attachment of a filter, a yielding sleeve within the tube resting upon the said shoulder, and an annular flange at the end of the screw-threaded portion with a hole therethrough and an annular bead outside said hole, as and for the purpose specified.

2. A device for the purpose described, consisting of a tube with screw-threads and internal shoulder, the threaded end of the tube being partially closed forming an inwardly-extending flange with opening and annular bead, as and for the purpose specified.

In testimony whereof I have hereunto set my hand in the presence of two subscribing witnesses.

JOHN ELLIS.

Witnesses:
EDWIN W. BROWN,
F. B. WENTWORTH.